(No Model.)
W. G. WARDEN.
Apparatus for and Process of Cooling and Refining Oil.
No. 240,936. Patented May 3, 1881.
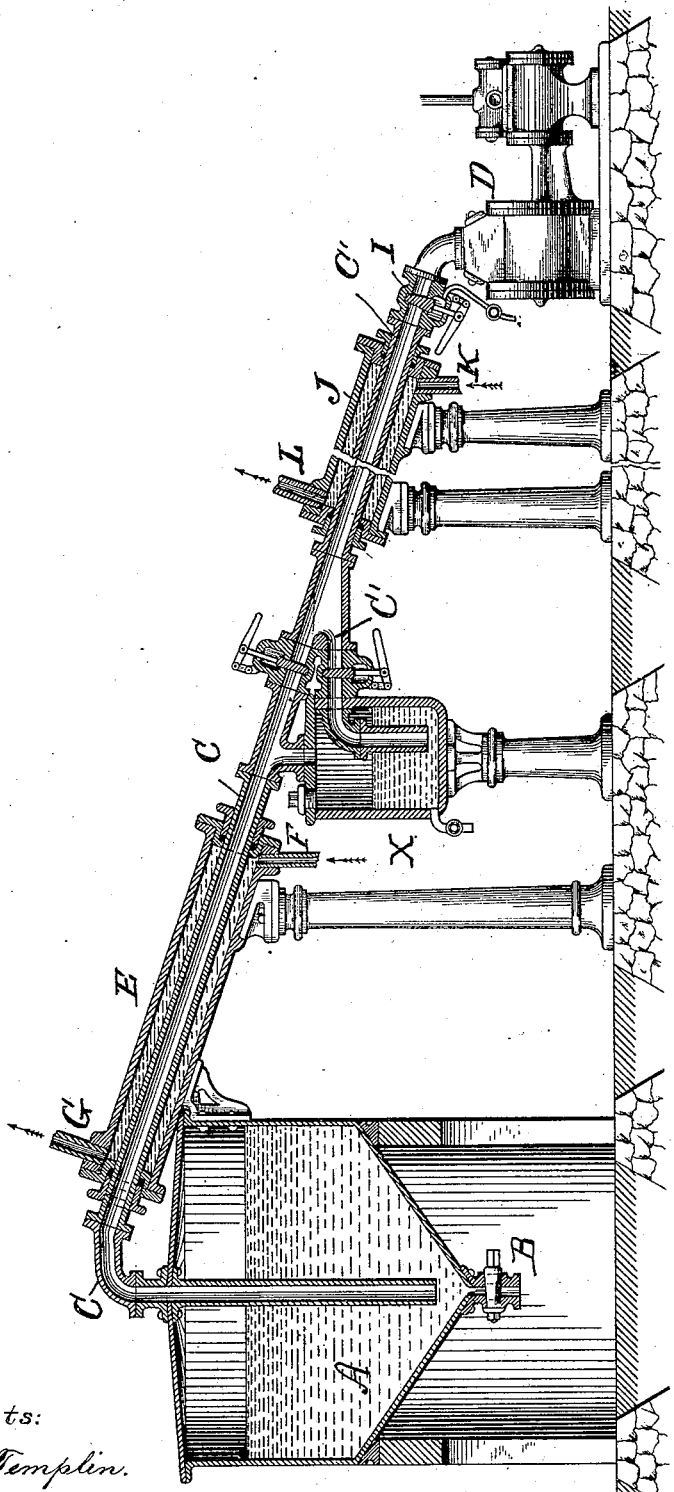
Attests:
J. H. Templin.
Inventor:
Wm. G. Warden,
By his Attorneys,
W. C. Strawbridge,
Bonsall Taylor.

UNITED STATES PATENT OFFICE.

WILLIAM G. WARDEN, OF PHILADELPHIA, PENNSYLVANIA, ASSIGNOR TO THE ATLANTIC REFINING COMPANY, OF SAME PLACE.

APPARATUS FOR AND PROCESS OF COOLING AND REFINING OIL.

SPECIFICATION forming part of Letters Patent No. 240,936, dated May 3, 1881.

Application filed November 4, 1880. (No model.)

*To all whom it may concern:*

Be it known that I, WILLIAM G. WARDEN, of the city of Philadelphia, in the State of Pennsylvania, have invented an Improvement in Apparatus for and Process of Cooling and Refining Oil, of which the following is a specification.

The object of my invention is the agitation of oils in such manner and by such means that the temperature of the mass of oil during agitation is kept at so low a point as to facilitate the separation of tar and other impurities therefrom.

Heretofore the process of agitating oil for purifying purposes has consisted, essentially, of the following steps, viz: Warm distillate or oil from the still is mixed with cold water in an agitator. The mixed mass is agitated by means of a blast of air forced through it. The water is then drawn off from the bottom of the agitator, and the cooled oil is dried or freed from moisture, as well as from tar, by the addition of sulphuric acid and by agitation together therewith by means of a blast of air forced into and through the mixture in the agitator. By the above treatment the water and tar have been caused to separate from the oil and to fall to the bottom of the agitator, at which point they are drawn off. In the above operation, however, the temperature of the oil is gradually raised by reason of the increase of temperature of the air-blast due to the force and velocity with which it is forced into the agitator, and by reason of the action of the sulphuric acid upon the water or moisture in said air-blast, with the result that the separation of tar from the oil is rendered more slow and incomplete as the temperature of said mass increases.

My invention consists in providing a process of and apparatus for cooling and purifying oils.

The drawing is a vertical longitudinal central view, partly in section and partly in elevation, of my improved apparatus.

A is an agitator, in the present instance shown with conical top and bottom, and provided at its bottom with an outlet and cock, B.

D is a blower or blast-engine of any convenient construction, upward from which extends a blast-pipe, C', which leads into and discharges its blast near the bottom of a tightly-covered acid-proof tank, X, and beneath the surface of the sulphuric acid with which the tank is nearly filled.

From the top of the tank X an air-blast pipe, C, extends to and through the top of the agitator A and downward to within a short distance of the bottom of the same.

I is an air-valve to regulate the blast.

J is a water-jacket surrounding the blast-pipe C', provided at its lower end with a water-inlet, K, and at its upper end with a water-outlet, L, located upon said blast-pipe between the blower D and the acid-tank X, and so arranged as to be constantly fed with a supply of cold water.

E is a water-jacket surrounding the blast-pipe C, provided at its lower end with a water-inlet, F, and at its upper end with a water-outlet, G, and arranged in like manner as is the jacket J, to be constantly fed with a cold-water supply.

In operation, the air-blast is forced by the blower through the blast-pipe C', into and through the acid in the tank X, and thence through the blast-pipe C to the agitator A, with the result that the air is first cooled and to a considerable extent dried in its passage through said pipe C', is further dried in its passage through the acid in the tank X, and is again cooled and dried in its passage through the pipe C.

The agitator A, blower D, water-jacket E, and blast-pipe C C', above referred to, are shown, described, and claimed in an application for Letters Patent filed by me of even date herewith. These devices are not claimed by me in this application.

The acid-tank X, in connection with the devices just named, is shown and described in an application for Letters Patent filed by George H. Perkins, of even date herewith. To this combination I lay no claim.

Having thus described my invention, I claim and desire to secure by Letters Patent of the United States—

1. The process of cooling and refining oil, which consists in agitating it with a blast of air, which air has been previously cooled and dried by being passed successively, first, in contact with a cooled surface; second, through a bath of sulphuric acid; and, third, in contact with a cooled surface, substantially as set forth.

2. An apparatus for cooling and purifying oil, which consists in a vessel or agitator for containing oil, an air-blower, an air-blast pipe extending from said blower into a bath of sulphuric acid contained in an air-tight tank, and an air-blast pipe extending from the top of said acid-tank to a point within said agitator in proximity to the bottom thereof, each of said air-blast pipes being surrounded by a water-jacket adapted to contain water, all substantially as set forth.

In testimony whereof I have hereunto signed my name this 25th day of October, A. D. 1880.

WILLIAM G. WARDEN.

In presence of—
G. H. PERKINS,
W. C. STRAWBRIDGE.